US008919402B2

(12) United States Patent
Hansen

(10) Patent No.: US 8,919,402 B2
(45) Date of Patent: Dec. 30, 2014

(54) AUTOMATIC INFLATOR FOR MAINTAINING A TIRE PRESSURE

(76) Inventor: Anthony D. A. Hansen, Berkeley, CA (US)

(*) Notice: Subject to any disclaimer, the term of this patent is extended or adjusted under 35 U.S.C. 154(b) by 553 days.

(21) Appl. No.: 12/951,369

(22) Filed: Nov. 22, 2010

(65) Prior Publication Data

US 2011/0120611 A1    May 26, 2011

Related U.S. Application Data

(60) Provisional application No. 61/263,759, filed on Nov. 23, 2009.

(51) Int. Cl.
*B60C 23/12*    (2006.01)
(52) U.S. Cl.
CPC .................................. *B60C 23/12* (2013.01)
USPC ........................................... 152/419; 152/418
(58) Field of Classification Search
USPC ................... 152/427, 415, 419; 137/224, 225
See application file for complete search history.

(56) References Cited

U.S. PATENT DOCUMENTS

| 4,651,792 | A | * | 3/1987 | Taylor | 152/415 |
| 4,987,937 | A | * | 1/1991 | Nowicke | 152/400 |
| 5,479,975 | A | * | 1/1996 | Fogal et al. | 152/429 |
| 5,807,445 | A | * | 9/1998 | Hoffmann | 152/415 |
| 7,237,590 | B2 | * | 7/2007 | Loewe | 152/419 |
| 7,314,072 | B2 | * | 1/2008 | Bunker | 152/419 |
| 7,322,392 | B2 | * | 1/2008 | Hawes | 152/419 |
| 7,784,513 | B2 |  | 8/2010 | Loewe |  |
| 2001/0015224 | A1 | * | 8/2001 | Freigang et al. | 137/224 |
| 2004/0045651 | A1 | * | 3/2004 | Haunhorst et al. | 152/415 |
| 2010/0000647 | A1 | * | 1/2010 | Naito et al. | 152/520 |

* cited by examiner

*Primary Examiner* — Kip T Kotter
*Assistant Examiner* — Jean Charleston
(74) *Attorney, Agent, or Firm* — Steven R. Vosen

(57) ABSTRACT

An apparatus and method are described for extracting useful work from pressure transients in a pneumatic tire to replace lost air from the tire. The apparatus and method operate continuously and without human intervention. When also used with a pressure relief valve, the apparatus and method permit the tires that are being driven to be maintained at a desired average pressure.

8 Claims, 3 Drawing Sheets

AUTOMATIC INFLATOR FOR MAINTAINING A TIRE PRESSURE

CROSS-REFERENCE TO RELATED APPLICATIONS

This application claims the benefit of U.S. Provisional Application No. 61/263,759, filed Nov. 23, 2009, the entire contents of which are hereby incorporated by reference herein and made part of this specification.

BACKGROUND OF THE INVENTION

1. Field of the Invention

The present invention generally relates to a method and apparatus for maintaining the proper pressure in a pneumatic tire, and more particularly to a method and apparatus for automatically having the tire pressure maintained while driving and without driver intervention or care.

2. Discussion of the Background

Pneumatic tires provide low rolling resistance and a high degree of maneuverability when the proper air pressure is maintained. All tires tend to lose air over time, and it is left to the driver or maintenance personnel to ensure that vehicle tires are inflated to the proper pressure. As a result, many cars and trucks are actually found to be operating with tires which are under-inflated, a condition that affects vehicle drivability, safety, and fuel economy. There exists a need in the art for a method and apparatus that can automatically maintain a proper air pressure within a tire. The apparatus should be economical and be easy to use with existing wheels, rims and tires, and be operable without maintenance, adjustment, power source, or connection to any external systems.

BRIEF SUMMARY OF THE INVENTION

The present invention overcomes the disadvantages of prior art by providing a device and method for providing air to tires without human intervention. By maintaining correct tire pressure, the use of the invention will reduce the safety hazards associated with driving on under-inflated tires, which include the possibility of blow-out and loss of control. Further, the use of the invention may promote increased tire operating lifetime and reduced rolling resistance, which will help to prevent unnecessary fuel consumption.

In certain embodiments, a method is provided to inject air into tires as a natural consequence of driving. The injection of air may compensate for loss of pressure due to leakage and will allow the tire to be maintained at its optimal working pressure.

In certain other embodiments, an apparatus is provided that automatically injects air into tires as a natural consequence of driving activity without any intervention by the vehicle owner or operator. In an alternative embodiment, when the air pressure in the tire reaches a set-point, a pressure-controlling valve may release excess air, preventing over inflating of the tire.

In certain other embodiments, an apparatus may be installed inside the tire or incorporated into the wheel, and therefore be protected against contamination, impacts, or tampering.

In certain embodiments, an apparatus is incorporated as an integral part of a manufactured wheel and thus will work with any tire subsequently fitted to the wheel.

In certain embodiments, a device for a pressurizing the interior of a pneumatic tire of a vehicle is provided, where the interior tire pressure undergoes transients of pressure during operation of the vehicle. The device includes a pump that utilizes internal pressure transients to pressurize ambient air and provide the pressurized air to the interior of the tire.

In certain other embodiments, a device for a pressurizing the interior of a pneumatic tire of a vehicle is provided, where the interior tire pressure undergoes transients of pressure during operation of the vehicle. The device includes a pump that utilizes internal pressure transients to pressurize ambient air and provide the pressurized air to the interior of the tire. The pump includes a first chamber having a variable internal volume with an inlet including a first one-way valve configured to accept ambient air into the chamber volume and an outlet including a second one-way valve configured to provide air from the chamber volume into the interior. The pump also includes a second chamber having a variable internal volume, where the second chamber includes a diaphragm in communication with the interior pressure and configured to transmit high interior pressure forces to pressurize air within the first chamber. The transients in the interior pressure provide pressurized air to the tire.

In yet other certain embodiments, a method is provided for of providing air to a pneumatic tire having an average pressure, where the tire experiences pressure transients. The method includes operating a pump in constant communication with the interior of the tire, where the operating includes extracting work from the pressure transients to provide ambient air into the tire.

These features together with the various ancillary provisions and features which will become apparent to those skilled in the art from the following detailed description, are attained by the method and apparatus of the present invention, preferred embodiments thereof being shown with reference to the incorporated drawings, by way of example, wherein:

BRIEF DESCRIPTION OF THE SEVERAL VIEWS OF THE DRAWING

FIG. 4 illustrate a method of using pump embodiments, where

Reference symbols are used in the Figures to indicate certain components, aspects or features shown therein, with reference symbols common to more than one Figure indicating like components, aspects or features shown therein.

DETAILED DESCRIPTION OF THE INVENTION

Embodiments described herein include a pump that may be used to extract useful work from pressure transients within a pneumatic tire. Certain embodiments include, but are not limited to, impulse-driven diaphragm pumps. These pressure transients may occur, for example, when the vehicle on which the tires are mounted passes over bumps in the road as a natural consequence of driving. Thus, for example, one side of a diaphragm is exposed to the instantaneous pressure in the tire cavity, and the other side of the diaphragm is maintained at an average pressure. When the transient exceeds the average pressure, the pump may extract useful work from the gas. Certain embodiments described herein include a miniature diaphragm pump that provides air into a pneumatic tire of a vehicle, where a force for driving the pump, and thus inflating the tire, is obtained from tire pressure transients that result from the vehicle passing over bumps in the road.

Figure 1:
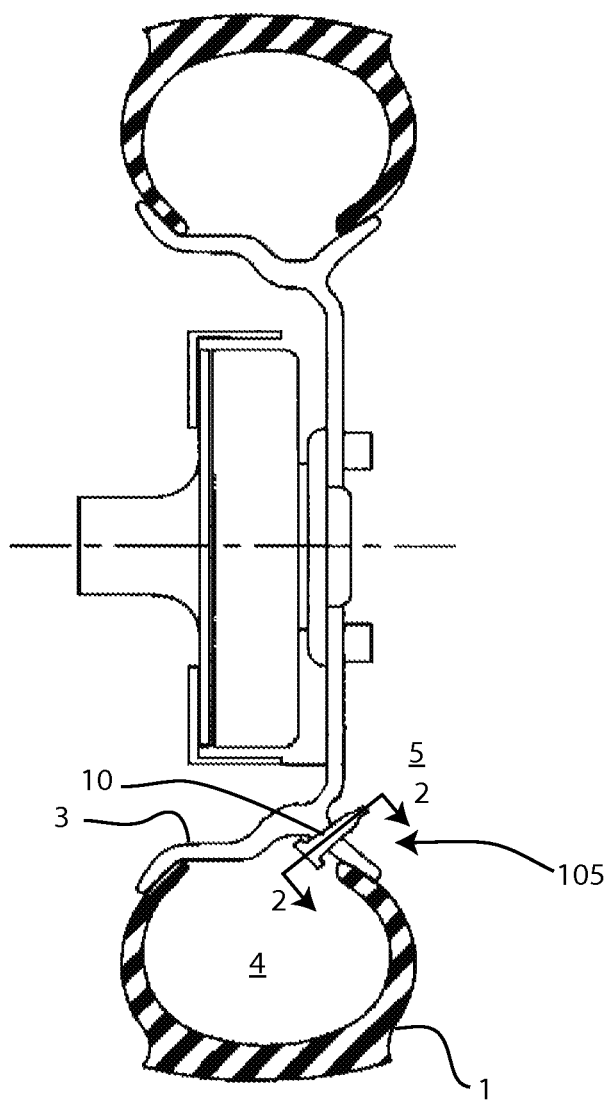
FIG. 1 is a cross-sectional view of a pneumatic tire including a pump installed in the valve stem.

Embodiments of the present invention include a pump installed through the wall or rim of a tire. Thus, for example and without limitation, certain embodiments provide a pump placed through the wheel of a pneumatic tire. Other certain embodiments provide a pump placed through the rubber portion of the tire. The pump may be on the inside of the tire, on outside of the tire, or partially or completely within the wall of the tire. Certain other embodiments provide the pump within a valve stem. For example and without limitation, FIG. 1 is a cross-sectional view of a pneumatic tire 1 having an interior tire cavity volume 4 in an ambient environment 5. Tire 1 is installed on a wheel rim 3 and includes a pump 10 installed in a valve stem 105. In various embodiments, pump 10 may be located within volume 4, on the outside of tire 1 in ambient environment 5, within valve stem 105, or within tire 1 or rim 3.

Figure 2:
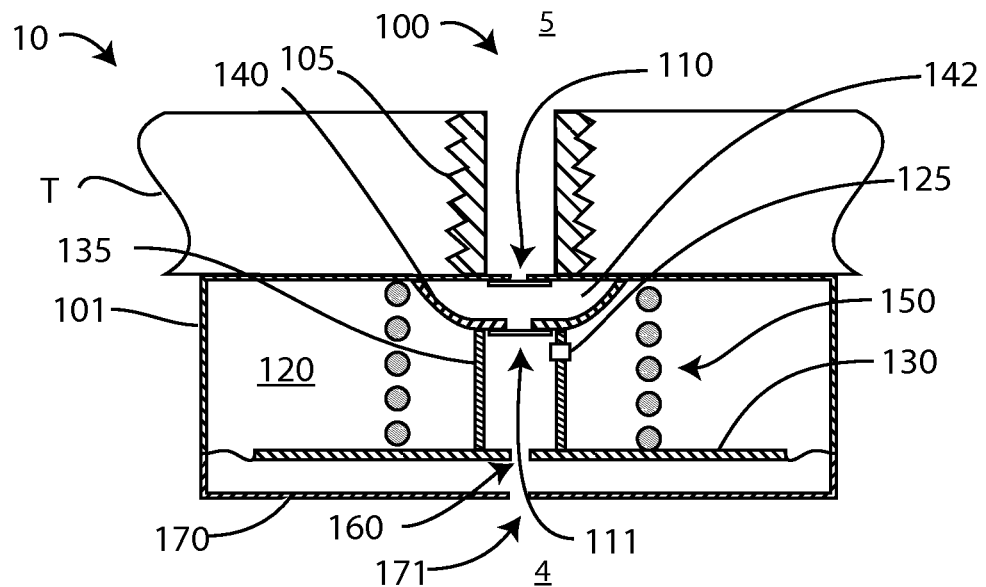
FIG. 2 is a schematic of a first embodiment pump as installed within a tire cavity.

FIG. 2 is a schematic of a first embodiment pump 10 as installed within a tire cavity 4. For illustrative purposes, a portion of the wall or wheel of the tire is shown as tire T. As shown in FIG. 2, pump 10 includes an air inlet 100, an outer housing 101, a threaded mounting stem 105, a first one-way valve 110, a second one-way valve 111, a first chamber 142, a first diaphragm 140, a second chamber 120, a second diaphragm 130 having an opening 160, a coupling rod 135, a sintered insert 125, a spring 150, an opening 160, and a cover 170 having an opening 171. One-way valves 110 and 111 are configured to provide a flow of air from the exterior of the tire to the interior of the tire.

In one embodiment, air inlet 100 is in fluid communication with ambient air of environment 5, and opening 171 is in fluid communication with volume 4. A cap (not shown) may be present to prevent the ingress of dust, mud, or other contamination from entering pump 10.

First chamber 142 is bounded by housing 101, first diaphragm 140, first one-way valve 110 and second one-way valve 111. Second chamber 120 is bounded by housing 101, first diaphragm 140, second diaphragm 130, and coupling rod 135 which connects the first and second diaphragms, and has sintered insert 125 to provided restricted fluid communication between the second chamber and the interior of tire T, and thus allow the pressure within chamber 120 to be approximately the average tire pressure. Spring 150, located between housing 101 and second diaphragm 130, provides a restoring force for the second diaphragm after a pump stroke. Cover 170 provides mechanical protection to diaphragm 130.

Threaded mounting stem 105 is used for affixing the assembly inside the tire cavity. Stem 105 may pass, for example, through the wheel wall of tire T such that inlet 100 is exposed to the outside ambient air. One-way valves 110 and valve 111 permit ambient air flow into pump 10. Sintered insert 125 permits the very slow equilibration of air pressure between chamber 120 and the tire cavity, permitting the permeation of air through it, with a high resistance to flow. Chamber 120 is thus maintained at a pressure equal to the long-term average of the tire cavity pressure.

In certain embodiments, the volume of second chamber 120 is larger than the volume of first chamber 142. First chamber 142 confines a small volume of air between one-way valves 110 and 111. First diaphragm 140 is connected to second diaphragm 130 through coupling rod 135, and thus motion of the second diaphragm towards the first diaphragm and the action of one-way valves 110 and 111 compresses air within first chamber 142 and will provide the compressed air into tire T. Diaphragm 130 is preferably constructed from a lightweight metal sheet attached to a flexible metal seal around the perimeter and then to housing 101.

Figure 3:
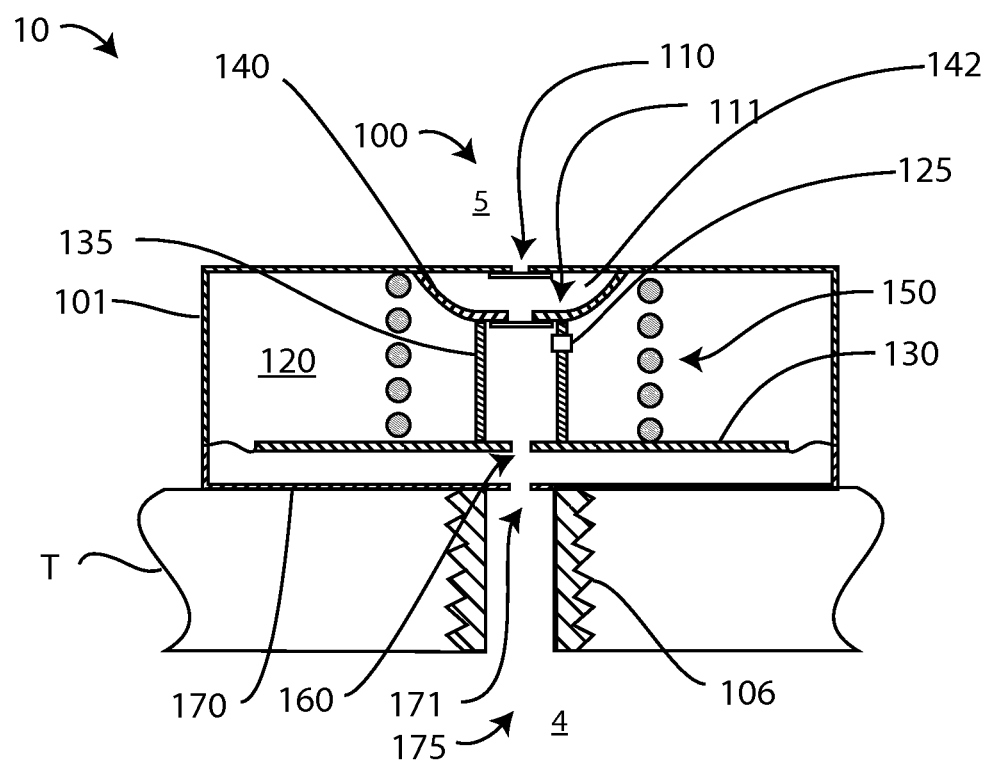
FIG. 3 is a schematic of a second embodiment pump as installed outside of a tire cavity.

FIG. 3 is a schematic of a second embodiment pump 10 as installed outside of a tire cavity. Pump 10 of FIG. 3 is generally similar to the pump of FIG. 2, except as further detailed below. Where possible, similar elements are identified with identical reference numerals in the depiction of the embodiments of FIGS. 1, 2 and 3.

Pump 10 of FIG. 3 is intended installation on the wheel outside the cavity of tire T, and includes a mechanical connection 106 to a passage leading to the tire cavity, and opening 175 provides pumped air which is injected into the tire. Front cover 170 is a mechanical part of housing 101 and is strong enough to withstand the tire pressure.

In an alternative embodiment, chamber 120 of FIG. 2 or FIG. 3 may not include insert 125 and is sealed permanently at a predetermined desired average tire pressure.

The following is an example of the use of pump 10 to replace air which naturally leaks from a pneumatic tire over time. In general, pump 10 includes two coupled diaphragms, such as diaphragms 130 and 140, which amplify pressure transients in the tire to pump ambient air into the tire. More specifically, transient pressures resulting from driving over bumps in the road under normal conditions will result in transient pressures which may be used to pump air into the tire. In certain embodiments, chamber 120 is maintained at the average tire pressure by permitting only a very restricted communication of air to the cavity volume through sintered insert 125, which may be a sintered insert or similar device of microscopic porosity and thus presents a high-impedance path to air flow. Insert 125 thus allows the gradual equilibration of air between the tire and chamber 120 over time periods greater than the pressure transients, but less than the time over significant pressure is lost from the tire. The time period for equilibration may thus be on the order of hours or days.

Diaphragm 130 is in fluid communication with the interior of the tire, and experiences transients in tire pressure. The coupling of the relatively larger diaphragm 130 to the smaller diaphragm 140 amplifies the pressure, resulting in a higher pressure in chamber 142, which may then be injected in to the tire through one-way valve 111. Once the air passes through one-way valve 111 and diaphragm 130 moves towards the original position, the pressure in chamber 142 drops below atmospheric pressure, one-way valve 111 closes and one-way valve 110 opens, refilling chamber 142 with ambient air.

As described herein, pump 10 may be operated from transient pressures in the tire. As a example of the use of pump 10, assume that each time the vehicle passes over a bump in the road, the tire pressure experiences a transient increase of pressure due to the compression of the rubber, increasing in pressure from a pressure P(tire) to a pressure {P(tire)+$\Delta$P} where the transient increase is $\Delta$P. If the pressure inside of chamber 120 is the average tire pressure P(tire), then the pressure difference of $\Delta$P acting on the area of diaphragm 130 creates a force. The force will displace diaphragm 130 which, through the coupling action coupling rod 135 will displace diaphragm 140, thus increasing the pressure of air within chamber 142.

The following examples are illustrate designs and uses of pump 10, and are not meant to limit the scope of the present invention. A typical automobile tire contains approximately 30 liters of air at STP (standard temperature and atmospheric pressure), and at a pressure of 30 psig. It is not unreasonable that approximately 3% of the volume escapes from the tire per month, resulting in a loss of approximately 1 liter of air and 1 psi of tire pressure. Larger pumps may be designed for use in larger tires, as are used on trucks and heavy equipment.

As a numerical example, if the tire rubber is temporarily displaced inwards by 1 cm over a contact footprint of 30 cm$^2$, the tire cavity volume will be decreased by 0.3%, with a resulting instantaneous pressure increase of approximately $\Delta P=0.1$ psig over a substantial area of diaphragm 130. If the tire encounters a bump in the road every 100 feet, there will be on the order of 30 pump strokes per mile. In 1000 miles of driving there will be 30,000 pump strokes. If each pump stroke injects 30 cubic millimeters of air, this will create a total injection of total 1 liter of air pumped into the tire.

Pump 10 may be sealed, with only one small hole on the inner tire cavity side, and one on the outer air-inlet side. Pump 10 may, for example, be threaded into a hole either inside the tire, or on the outside rim. Installation inside the tire cavity would reduce exposure to weather, dirt, mechanical impact and tampering. The assembly could also be manufactured as an integrated unit to be incorporated into the structure of a wheel, communicating with the tire cavity through an air passage. In this way, the assembly could be located at a smaller radius of rotation, leading to less centrifugal force acting on the components.

Figure 4A:
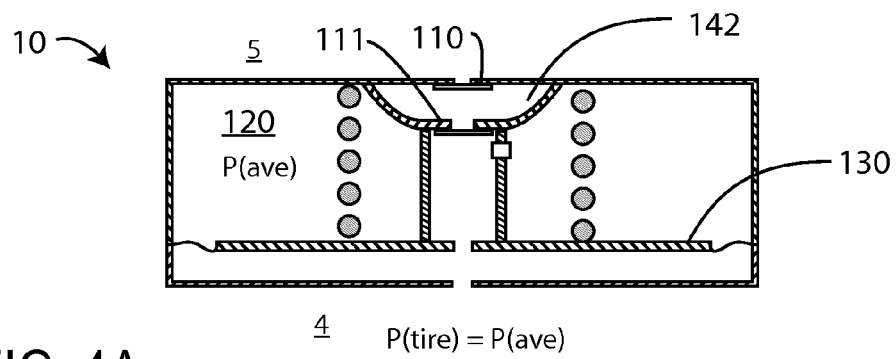
FIG. 4A illustrates a rest state for pump.
Figure 4B:
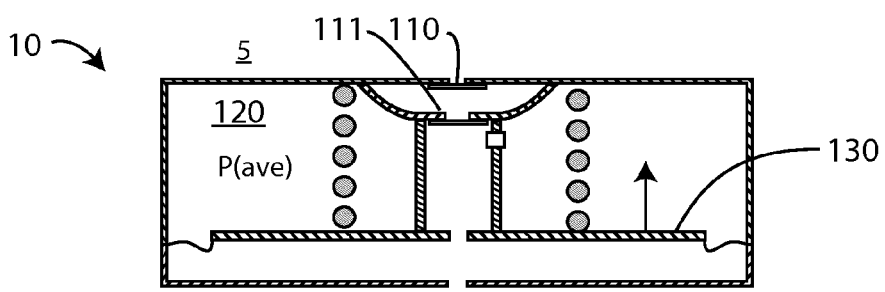
FIGS. 4B and 4C illustrate consecutive states during pumping.
Figure 4C:
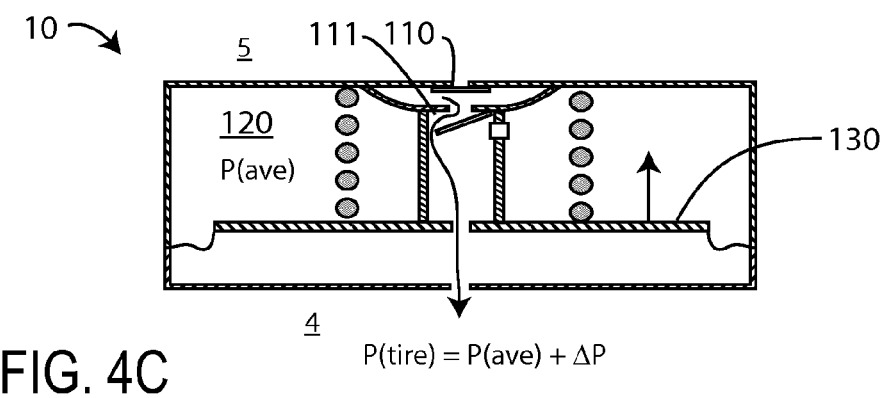
Figure 4D:
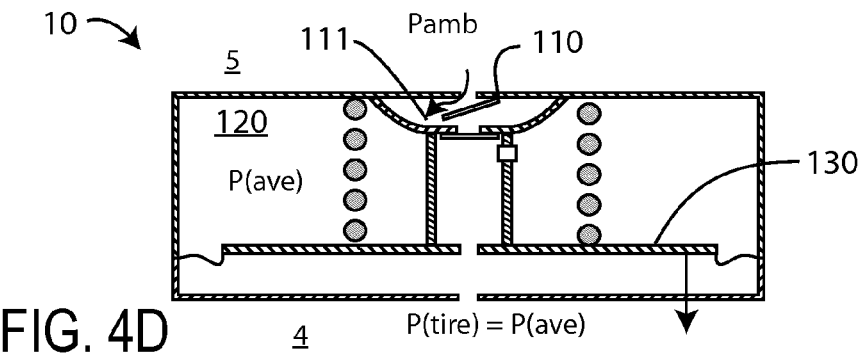
FIG. 4D illustrates the recovery of the pump.

FIGS. 4A-4D illustrate the use of pump 10 to provide air to a tire resulting from pressure transients, where FIG. 4A is a rest state for pump 10, FIG. 4B shows the compression of air in sealed chamber, FIG. 4C shows the pumping of the compressed air into the tire, and FIG. 4D shows an intake of ambient air after pumping.

In FIGS. 4A-4D, the pressure within chamber 130 is the average tire pressure, P(ave), where FIG. 4A illustrates a rest state for pump 10, FIGS. 4B and 4C illustrate consecutive states during pumping, and FIG. 4D illustrates the recovery of the pump. The tire pressure P(tire) is illustrated as varying from the average tire pressure of P(ave) in FIG. 4A to an increased pressure P(tire)={P(ave)+$\Delta P$} in FIGS. 4B and 4C, back to the average pressure in FIG. 4D.

More specifically, in FIG. 4A, the tire pressure P(tire) is at the average tire pressure of P(ave), and one-way valves 110 and 111 are closed. In FIG. 4B, a pressure transient in the tire to P(tire)={P(ave)+$\Delta P$} results in a pressure differential of $\Delta P$ acting on diaphragm 130. The resulting displacement of diaphragm 130 is coupled to diaphragm 140 through coupling rod 135. One-way valves 110 and 111 remain closed, and the pressure within chamber 142 increases.

In FIG. 4C, diaphragm 130 is displaced further. Eventually, the pressure within chamber 142 increases from atmospheric pressure to a pressure greater than P(tire)={P(ave)+$\Delta P$}. One-way valve 111 then opens, as illustrated in FIG. 4C, and air is pumped into the tire.

In FIG. 4D, the tire pressure has returned to P(tire)=P(ave). Spring 150 forces diaphragm 130 back to the position shown in FIG. 4A. One-way valve 111 closes and, when the pressure within chamber 142 drops below ambient pressure, one-way valve 110 opens, drawing in ambient air. When the next pressure transient occurs in the tire, the cycle then repeats from the configuration shown in FIG. 4A.

Pump 10, or a device having equivalent functionality, enable the use of transient pressure impulses generated by the passage of the tire over a naturally-occurring road bump, to inject a small volume of outside air into the tire cavity each time the wheel passes over a bump. Although each injection amount is small, this action repeated over many thousands of impulses will inject sufficient air into the tire to overcome gradual loss of pressure.

A separate device (not shown) essentially of the form of a pressure-regulating tire inflation valve stem, may release excess pressure once the desired working pressure has been achieved. In this way, considerations of specific pressure settings do not have to be incorporated into the design of the automatic inflator.

Reference throughout this specification to "certain embodiments," "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A device for a pressurizing the interior of a pneumatic tire of a vehicle, where the interior tire pressure undergoes transients of pressure during operation of the vehicle, said device comprising:
    a pump that operates from internal pressure transients to pressurize ambient air and provide the pressurized air to the interior of the tire, where said pump further includes:
        a chamber having a variable internal volume and including a first one-way valve, where said first one-way valve is configured to accept ambient air into the chamber volume,
        a second one-way valve, where said second one-way valve is configured to provide air from the chamber volume into the interior,
        a movable chamber wall forming the chamber volume, and
        a mechanism in contact with air in the interior and said movable wall,
        where, when the interior pressure increases, the mechanism moves the wall and decreases the chamber volume, such that the first one-way valve and second one-way valve close and the chamber pressure increases, and where, when the interior pressure decreases, the second one-way valve opens to allow air to flow from the chamber volume to the interior of the tire, such that the transients in the interior pressure provide pressurized air to the tire.

2. The device of claim 1, where said pump includes a diaphragm pump.

3. The device of claim 1, where said pump is within a valve stem of said tire.

4. The device of claim 1, where said pump obtains all energy for pumping air into the tire from the pressure transients of the interior pressure.

5. The device of claim 1, where said chamber is a first chamber, and where said pump includes a second chamber having walls defining a second variable volume, where said second chamber wall includes a diaphragm to transmit pressure from the interior of the pneumatic tire to the movable chamber wall of the first chamber, and where the pressure in said second chamber is approximately equal to the average tire pressure.

6. The device of claim 5, further including an opening between said second chamber and said interior to equilibrate the pressure between the second chamber and the interior.

7. The device of claim 6, further including a sintered material between said second chamber and said interior.

8. The device of claim 1, wherein said pump includes a mechanism to establish a minimum pressure, and wherein said pump operates from internal pressure transients having a pressure greater than the minimum pressure.

* * * * *